United States Patent [19]
Brown

[11] Patent Number: 5,117,580
[45] Date of Patent: Jun. 2, 1992

[54] HEAT TRANSFER TUBE FOR A SEEDBED COVER

[76] Inventor: G. Marvin Brown, 14002 Walden-Sheffield Rd., Dover, Fla. 33527

[21] Appl. No.: 546,761

[22] Filed: Jul. 2, 1990

[51] Int. Cl.⁵ .............................................. A01G 7/00
[52] U.S. Cl. ............................................. 47/9; 126/426; 405/131; 47/19
[58] Field of Search ................ 47/9 S, 19; 409/131; 126/426; 34/93

[56] References Cited

U.S. PATENT DOCUMENTS

| | | |
|---|---|---|
| 374,499 | 12/1987 | Siem . |
| 640,957 | 1/1900 | Sattler . |
| 1,268,649 | 6/1918 | Velde . |
| 1,930,939 | 10/1933 | Horner ................. 47/9 S |
| 2,592,976 | 4/1952 | Thomas . |
| 3,205,619 | 9/1965 | Henry . |
| 3,206,892 | 9/1965 | Telkes et al. . |
| 3,302,323 | 2/1967 | Popa . |
| 3,384,993 | 5/1968 | Kane ..................... 47/9 S |
| 3,888,418 | 6/1975 | Seith et al. . |
| 4,044,501 | 8/1977 | Frydryk . |
| 4,071,974 | 2/1978 | Tripp, Jr. . |
| 4,177,946 | 12/1979 | Sahagun-Barragan . |
| 4,267,665 | 5/1981 | Wallace et al. . |
| 4,309,843 | 1/1982 | Kato . |
| 4,357,884 | 11/1982 | Rast, Jr. . |
| 4,413,787 | 11/1983 | Gilead et al. . |
| 4,426,995 | 1/1984 | Wilson . |
| 4,782,626 | 11/1988 | Shanley ................. 47/9 S |
| 4,833,822 | 5/1989 | Digrassi . |

FOREIGN PATENT DOCUMENTS

| | | | |
|---|---|---|---|
| 91350 | 2/1962 | Denmark ................. 47/9 S |
| 2728412 | 1/1979 | Fed. Rep. of Germany ........ 47/9 S |
| 198954 | 12/1982 | Japan ..................... 47/9 S |
| 143053 | 6/1990 | Japan ..................... 126/426 |
| 611117 | 5/1979 | Switzerland ............. 47/9 S |

Primary Examiner—Henry E. Raduazo
Attorney, Agent, or Firm—Fleit, Jacobson, Cohn, Price, Holman & Stern

[57] ABSTRACT

A heat transfer tube extends along the peak of a dike having at least two rows of seedlings for collecting heat from the sun during the daytime and transferring the collected heat to the soil at night. The tube is of a geometrical configuration, preferably oval, and is made of transparent plastic. The tube is secured or in intimate contact on opposite sides to a mulching sheet made of opaque plastic, preferably black plastic during the winter growing season, and white plastic during the summer growing season. Optionally, a drip irrigation line is formed separately from or integrally with the heat transfer tube to irrigate the at least two rows of seedlings located on the peak of a dike.

18 Claims, 4 Drawing Sheets

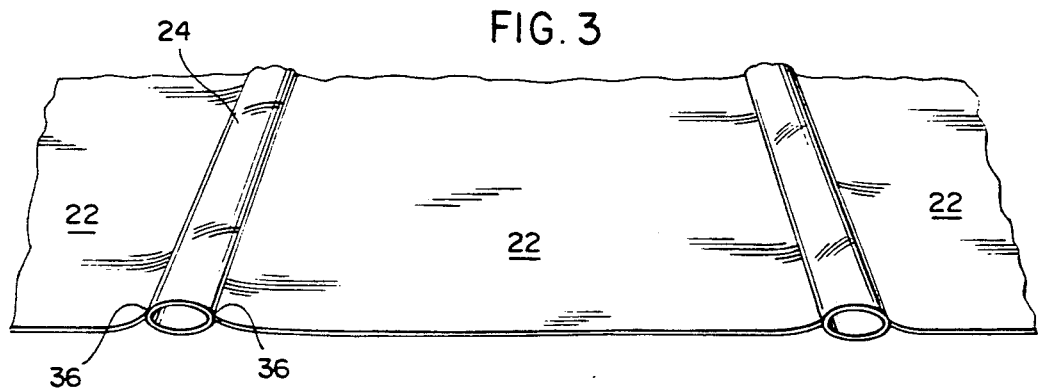
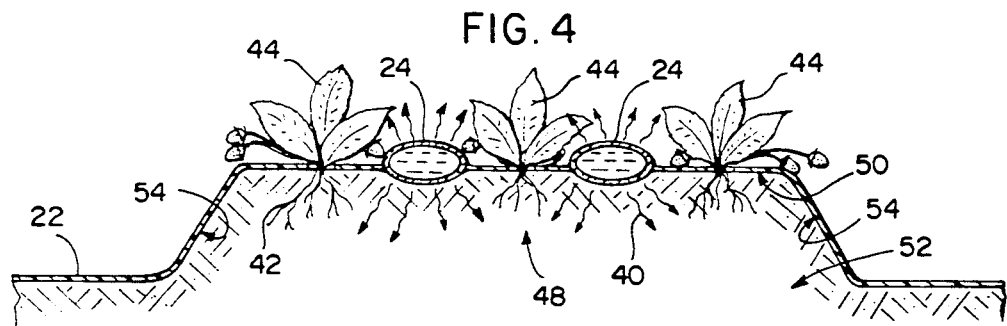
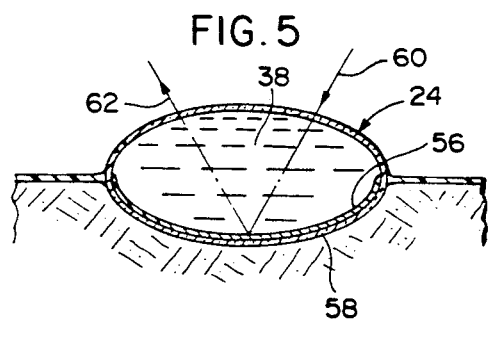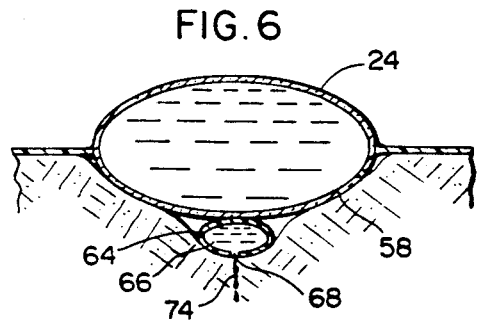
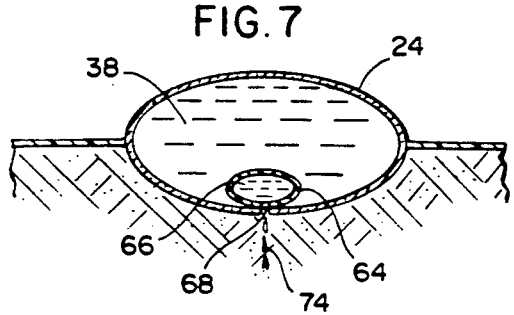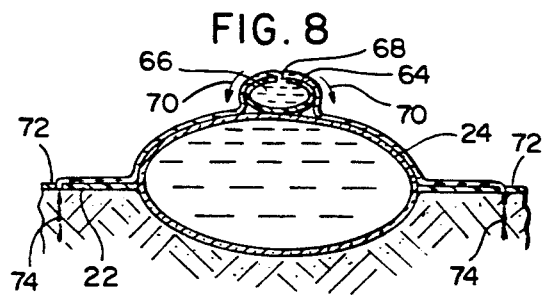

1

HEAT TRANSFER TUBE FOR A SEEDBED COVER

FIELD OF THE INVENTION

The present invention relates to a heating tube lying at a peak of a dike in a strawberry field which transfers heat absorbed during the daytime to the soil at night.

BACKGROUND OF THE INVENTION

In strawberry raising, particularly in Florida, it is advantageous to market new strawberries as early in the season as possible, typically in late January and early February, at which time a premium is paid for the strawberries. During the normal harvest season, prices for strawberries may be two-thirds less than the price for strawberries available during the early market.

Traditionally, strawberries are grown in dikes formed of raised banks of soil formed by a machine. The dikes have a base width typically of 31 inches and a top width of typically 28 inches at a height of 8 inches above the base. Inclined side walls join the top and base to form a trapezoid shaped dike.

A single piece of opaque plastic sheeting, such as polyethylene, and referred to as a mulching sheet or strip, is stretched across the dikes, and typically has a thickness of 2 to 5 mils. The plastic sheeting eliminates weeds and retains water entrapped below the plastic sheeting. Approximately every twelve inches in the plastic sheeting, a hole is punched and a strawberry seedling is inserted through the hole during the early weeks of October. Irrigation of the dikes may be provided by drip irrigation lines which are laid along the length of the dikes A problem with the raising of strawberries is that if the temperature of the soil falls below a certain temperature, typically 42° F., the progress of growth of the strawberry is arrested. The delay in growth affects the availability of the mature strawberries for early market which could result in obtaining a seasonal price for strawberries rather than the much greater early market price. Further, if the strawberries are subjected to wind or temperature less than 33° F. the berries of the plant are usually lost.

To avoid the loss of berries at a temperature of less than 33° F., a fine mist of well water is sprayed onto the plants. As the temperature dips below 33° F. and the water freezes, the freezing of the thin layer of water produces a loss of heat which is transferred to the plant to maintain the berries at a temperature above 33° F. This slight amount of ice formation does not hurt the berries in any way. However, due to water rationing, water is not always available for protecting the young strawberries during unseasonable bouts of cold weather.

Previous attempts to provide an improved mulching sheet or strip are disclosed in U.S. Pat. No. 4,833,822 to DiGrassi, U.S. Pat. No. 3,205,619 to Henry and U.S. Pat. No. 3,206,892 to Telkes et al. These patents disclose a tube of water located spaced from a seedling so as to anchor a mulching strip with respect to a single row of seedlings.

These patents disclose systems with limited use in expansive fields of strawberries for protecting strawberry seedlings and other crops, arranged in at least two rows at a peak of a dike.

SUMMARY OF THE INVENTION

It is therefore an object of the present invention to overcome the deficiencies of the prior practices in maintaining the ground temperature adjacent to at least two rows of seedlings on top of a dike above a predetermined temperature, below which growth of the seedling is arrested.

By the present invention, a transparent plastic heat transfer tube extends along the peak of a dike having at least two rows of seedlings on the dike for collecting heat from the sun during the daytime and transferring the collected heat to the soil at night. The tube is of a geometrical configuration, preferably oval, and is made of transparent plastic. The tube is secured or in intimate contact on opposite sides to a mulching sheet made of opaque plastic, preferably black plastic during the winter growing season, and white plastic during the summer growing season. An increase in temperature of the adjacent soil using black polyethylene plastic versus white polyethylene plastic is 8° F.

Optionally, a drip irrigation line is formed separately from or integrally with the heat transfer tube to irrigate the at least two rows of seedlings located on the peak of a dike.

Alternately, two heat transfer tubes may be located on top of the peak of a dike with three rows of seedlings located with a central row of seedlings extending between the two heat transfer tubes and a single row of seedlings extending outside of each of the two tubes. Alternately, two heat transfer tubes may extend across the peak of a dike with four rows of seedlings, with a row of seedlings located along opposite sides of each of the two heat transfer tubes.

The location at which the mulching sheet is secured to or in contact with the opposite sides of the tube may be varied to control the amount of heat absorbed by the heat transfer tube and transferred to the soil. Typically, the mulching sheet will be secured at opposite sides of the heat transfer tube at an approximate midpoint of the tube. To increase the amount of heat absorbed by the heat transfer tube, the opposite sides of the mulching sheet may be secured near the bottom of the heat transfer tube. Alternately, to decrease the amount of heat absorbed by the heat transfer tube, the mulching sheet may be secured adjacent to an uppermost surface of the heat transfer tube.

The heat transfer tube is filled with water from one of its ends, the opposite end being sealed. When the tube is filled with water, the filling end of the tube is also sealed by a heat-weld, threaded closure cap secured to a threaded filling port, or other conventional means for sealing water within the tube. If the temperature of the water in the tube becomes too warm, it is possible to drain some of the water from the heat transfer tube by use of a resealable closure. A reduction in the amount of water in the tube increases the amount of air present which would reduce the overall heat retention produced by the heat transfer tube.

It is desirable to maintain the soil temperature for winter strawberries by use of the heat transfer tube of the present invention at a minimum temperature range of 50° to 55° F. with a maximum temperature range of 70° to 75° F.

Optionally, an irrigation drip line may be used to provide water and nutrients to the seedlings. The drip line may be located on top of, below or inside of the heat transfer tube. When the drip irrigation line is located on top of the heat transfer tube, the released irrigation water is transferred to the seedlings through the opening in the plastic which have been cut for the original planting of the seedlings. When the drip irrigation line is located below the heat transfer tube or inside of the heat transfer tube, the water from the drip irrigation line is directly transferred to the soil.

It is also possible to provide transparent windows or openings in the mulch sheet which is laid over previously laid heat transfer tubes to allow warming of the water of the heat transfer tube directly through the windows. The windows are spaced in the portion on the mulch sheet overlapping at least one heat transfer tube, lying on the peak of the dikes. The windows are approximately three inches wide and extend twelve to fifteen inches in length along the length of the mulch sheet. Adjacent windows are separated by a distance of approximately two inches.

The material of the heat transfer tube may be vinyl, plastic, PVC, metal or any other material or combination of materials which would be capable of absorbing heat from sunlight during daytime hours, storing the heat in a heat transfer medium, such as water, and transferring heat to the soil which is in intimate contact with the heat transfer tube, during the night. The width of the heat transfer tube is approximately 3.5 to 8 inches with a thickness of 2 to 5 mils.

The heat transfer tube of the invention is a liquid-filled heat sink and/or heat absorption or transfer apparatus for use in the production of agricultural and other vegetative products including row crops, truck crops, shrubs, bushes, trees, vines, hothouse and landscape plants. The heat transfer is by convection, conduction and radiation to help maintain the growth medium and plants at optimum growth temperature. The tube is an aid in freeze protection and provides for stronger quality and quantity of plants and fruit. Also, the tube aids in early bloom set, ripening and harvest of the fruit or crop.

It is therefore another object of the present invention to provide a heat transfer tube extending along the peak of a dike between at least two adjacent rows of seedlings located at the peak of the dike.

It is yet another object of the present invention to provide a heat transfer tube extending along the peak of a dike between at least two adjacent rows of seedlings with the heat transfer tube including water for absorbing heat during the daytime and transferring the heat to the soil during the night.

It is still another object of the present invention to provide a heat transfer tube extending along the peak of a dike between at least two adjacent rows of seedlings with the heat transfer tube including water for absorbing heat during the daytime and transferring the heat to the soil during the night with a plurality of heat transfer tubes spaced across a mulching sheet with the separation between adjacent heat transfer tubes being equal to the distance between adjacent dikes.

It is still yet another object of the present invention to provide a heat transfer tube extending along the peak of a dike between at least two adjacent rows of seedlings with the heat transfer tube including water for absorbing heat during the daytime and transferring the heat to the soil during the night with a plurality of heat transfer tubes spaced across a mulching sheet with the separation between adjacent heat transfer tubes being equal to the distance between adjacent dikes and with the heat transfer tubes optionally including a drip irrigation line.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 3 is a perspective view of two heat transfer tubes extending parallel to each other and having a mulching sheet extending from opposite sides of the tubes.

FIG. 4 is a sectional view illustrating two heat transfer tubes extending between three rows of seedlings located at the peak of a dike.

FIG. 5 is a cross-sectional view of a heat transfer tube and mulch sheet having an internal reflective lining.

FIG. 6 is a cross-sectional view of a heat transfer tube and mulch sheet having a drip irrigation line secured to a bottom of the tube.

FIG. 7 is a cross-sectional view of a heat transfer tube and mulch sheet having a drip irrigation line located internally of the tube.

FIG. 8 is a cross-sectional view of a heat transfer tube and mulch sheet, with a drip irrigation line secured to a top surface of the tube.

DETAILED DESCRIPTION OF THE PREFERRED EMBODIMENTS

Figure 1:
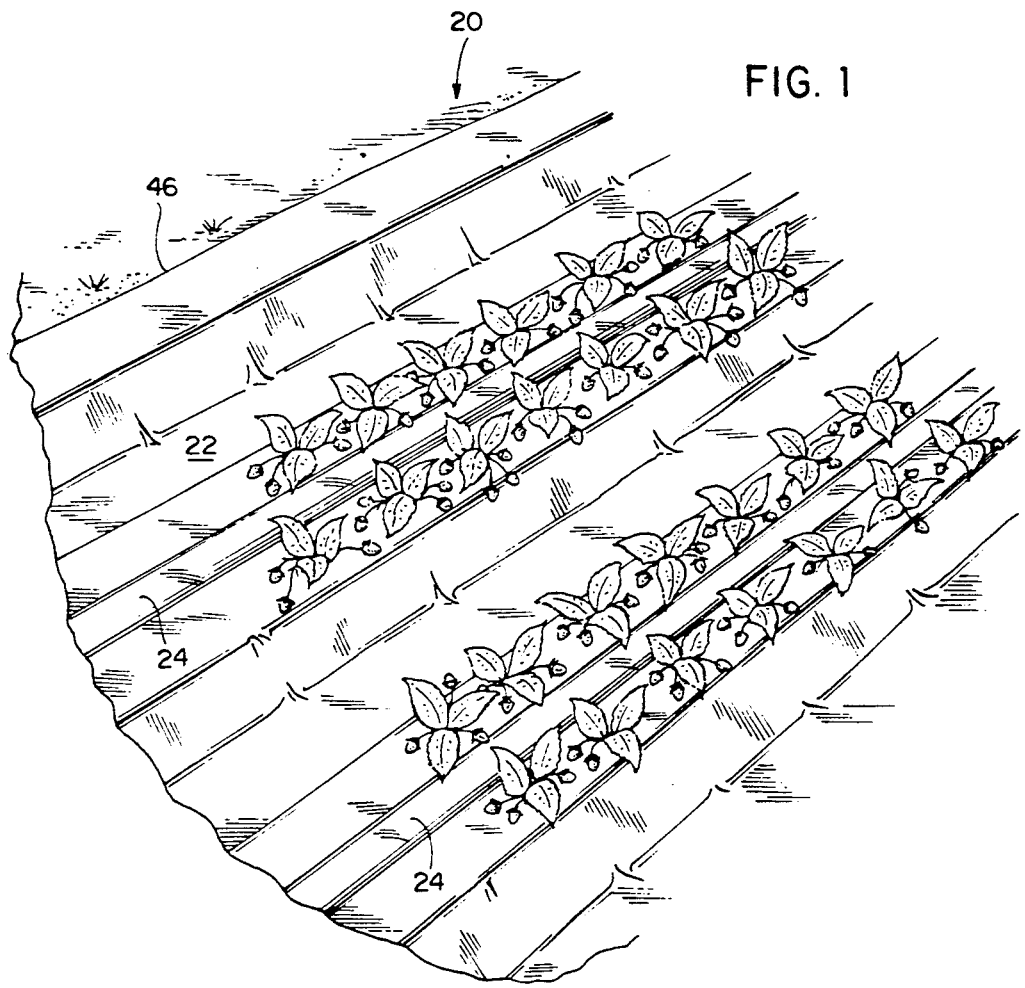
FIG. 1 a perspective view of a plurality of heat transfer tubes extending across the peak of dikes having at least two rows of seedlings on each dike located on opposite sides of the heat transfer tubes with a mulching sheet extending from opposite sides of the tubes.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
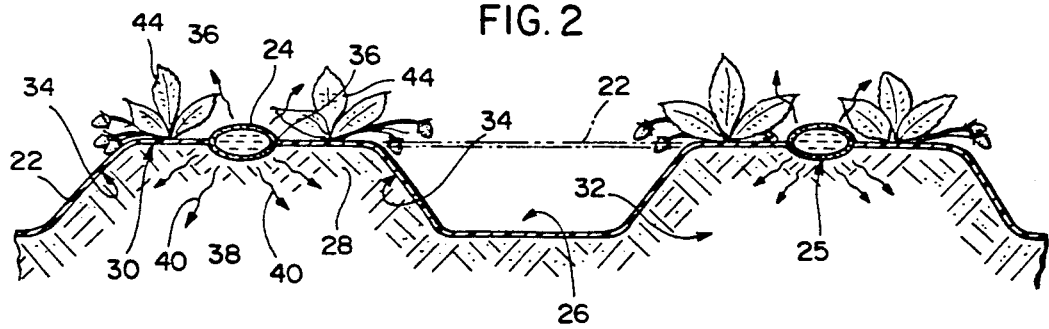
FIG. 2 is a sectional view taken along line 2—2 of FIG. 1.

With reference to the drawings, in general, and to FIGS. 1 through 3, in particular, a heat transfer system embodying the teachings of the subject invention is generally designated as 20. The heat transfer system 20 includes a continuous mulching sheet 22 which is only separated by a plurality of spaced, parallel extending heat transfer tubes 24 with the mulching sheet located on both sides of the heat transfer tube. Only two heat transfer tubes are shown in FIG. 1 for illustrative purposes. However, it is envisioned that there would be at least three parallel extending heat transfer tubes spaced across a field of plants or crops with the mulching sheet being located on both opposite sides of each heat transfer tube. The heat transfer tubes and mulching sheet would be manufactured in a rolled continuous length in a lay flat condition of the heat transfer tubes for subsequent expansion of the heat transfer tubes by water filling the tubes in the field.

The spacing between adjacent heat transfer tubes would be equivalent to the distance between adjacent center-lines of the peaks of adjacent dikes in the instance where a single tube is to be located between two rows of plants or crops on top of a dike. Changes in the distance between adjacent tubes would be made depending upon if the mulching sheet were to be stretched between adjacent dikes or if the mulching sheet were to lie in the troughs between adjacent dikes. Also, if more than one tube is to be located at the peak of each dike then a corresponding spacing adjustment must be made between groups of tubes which will be located at adjacent dikes.

The mulch sheet follows the contour of the troughs 26, up along and down the inclined sides and across the top of a dike 28 which is formed by a earth moving machine. Alternately, the mulch sheet is stretched tight between adjacent dikes as is shown in dotted lines.

The dikes are formed of collected soil in a raised trapezoidal shape. A machine forming the dikes is modified to form a depression 25 in the peak of the dikes to receive a heat transfer tube. The number and shape of the depression 25 is selected according to the number and shape of the heat transfer tubes to be located on each dike. The depression accommodates the tube and provides critical contact between the soil and the heat transfer tube.

The peak or top surface 30 of the dike is of a narrower width than the base 32 of the dike and includes opposite inclined sides 34 connecting the peak 30 and the base 32 of the dike 28. Extending centrally along the peak 30 of the dikes 28 in a planting field, as shown in FIG. 1, are transparent heat transfer tubes 24.

The mulching sheet 22 is connected at opposite points 36 to the heat transfer tube 24. The heat transfer tubes are filled with water 38. During the daytime hours, the portion of the heat transfer tube 24 projecting above the mulch sheet 22 absorbs sunlight through the transparent material of the heat transfer tube and elevates the temperature of the water filling the tube 24. During the night, the heat stored in the water 38 is radiated through the tube as shown by arrows 40 to warm the contacted soil and the roots 42 of the seedlings 44 located on opposite sides of the heat transfer tube at the peak of the dike as shown in FIG. 4. The temperature of the soil is thereby raised by the heat radiated by the heat transfer tube 24.

The mulch sheet 22 is anchored by burying the outermost edges 46, one of which is shown in FIG. 1, to prevent the large area of the mulch sheet from being blown by the wind. By locating the heat transfer tubes 24 centrally of the peak 30 of the dikes 28, the soil for two rows of seedlings 44 may be maintained at an elevated temperature which maintains the rate of growth of the seedlings despite any lowering of ambient temperatures.

In an alternate embodiment, as shown in FIG. 4, a series of spaced-apart dikes 48 have a wider peak 50 and a correspondingly wider base 52 than the peak and base shown in FIG. 2. The inclined sides 54 interconnect the peak and base. The peak is wide enough to accommodate two adjacent heat transfer tubes 24 spaced to separate three rows of seedlings 44 with a central row of seedlings located between the tubes 24 and a row of seedlings on the outside of each of the tubes 24.

To increase the amount of heat concentration in the water 38 extending through the tubes 24, a base coating 56 of the lowermost surface 58 of the tube 24 includes a reflective lining which may be formed of aluminum sheeting. Sun rays as indicated by arrow 60, pass through the transparent heat transfer tube 24, through water 38 and are reflected off the base coating 56, back through the water 38 and out of the heat transfer tube in a direction of arrow 62 so as to amplify the effect of sunshine passing through the water of the heat transfer tube 24. The increased temperature of the water 38 of the heat transfer tube shown in FIG. 5 is then radiated at night to the surrounding soil of the dike.

In FIGS. 6 through 8, an optional drip irrigation line 64 is shown in combination with a heat transfer tube. The drip irrigation line 64 includes a pressurized source of water 66 extending through the tube for water to be forced through an outlet 68 from the irrigation line. In FIG. 6, the irrigation line is connected to the lowermost surface 58 of the heat transfer tube 24. In FIG. 7, the drip irrigation line extends internally of the heat transfer tube 24 and includes an outlet 68 which is isolated from the water 38 in the heat transfer tube so as to permit egress of water through the outlet 68 while the water 38 remains in the heat transfer tube 24.

In FIG. 8, the drip irrigation tube 64 is secured to the top of the heat transfer tube 24 for passage of water out of the outlet 68 and down along the irrigation tube as shown by arrows 70. The water then passes along the mulch sheet 22 until reaching the opening 72 through which a seedling has been inserted to permit passage of the water drops 74 into the soil.

Figure 9:
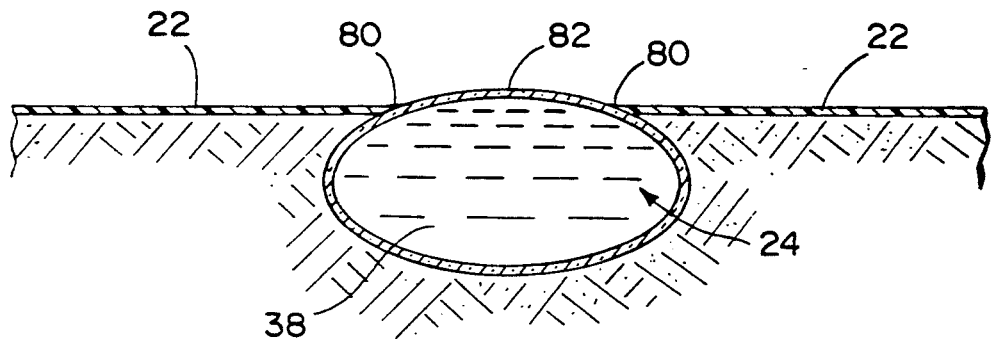
FIG. 9 is a cross-sectional view of a heat transfer tube and mulch sheet, with the mulch sheet being secured to opposite sides of the heat transfer tube at an uppermost surface of the heat transfer tube.
Figure 10:
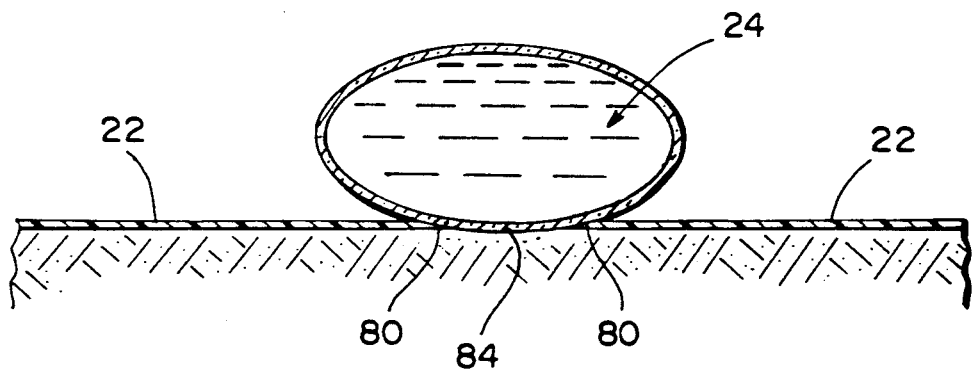
FIG. 10 is a cross-sectional view of a heat transfer tube and mulch sheet, with the mulch sheet being secured to opposite sides of the heat transfer tube at a lowermost surface of the heat transfer tube.

In FIGS. 9 and 10, the connection points 80 of the mulching sheet 22 to the heat transfer tube 24 have been varied such that in FIG. 9, the connection points 80 are adjacent to an uppermost surface 82 of the heat transfer tube 24. In FIG. 10, the connection points 80 are located adjacent to a lowermost portion 84 of the heat transfer tube 24.

By these different points of connection, it is seen that in FIG. 9, limited exposure of the heat transfer tube to the sunlight is permitted for lessened heating of the water 38 within the tube as compared to opposite, midpoint connections of the mulching sheet to the heat transfer tube as shown in FIGS. 2 through 8. However, due to a substantial portion of the heat transfer tube being located below the mulching sheet 22 and in contact with the surrounding soil, a large amount of heat transfer is obtained due to the extent of contact of the heat transfer tube with the surrounding soil.

In contrast, in FIG. 10, a large amount of heat is absorbed by the heat transfer tube due to the large exposure of the heat transfer tube to the sunlight. However, limited heat transfer is obtained due to the limited portion of the heat transfer tube in contact with the soil, below the mulching sheet 22.

Figure 11:
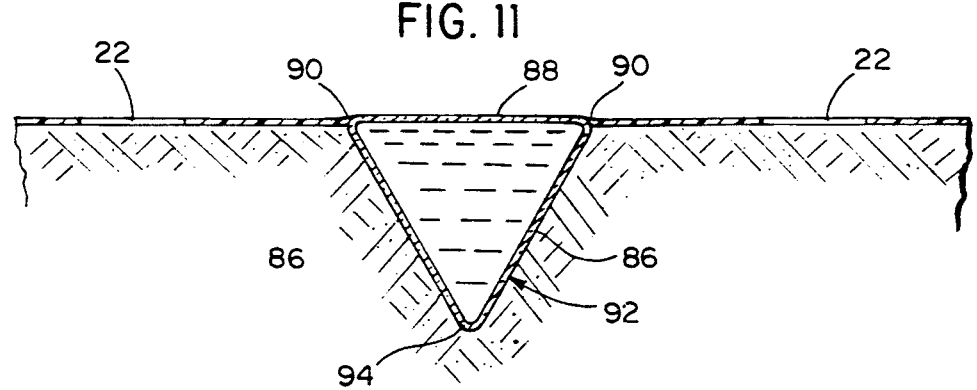
FIG. 11 is a cross-sectional view of a heat transfer tube and mulch sheet, with the mulch sheet being secured to an uppermost surface of the heat transfer tube, on opposite sides of the heat transfer.

In FIG. 11, the heat transfer tube has a triangular shape with two faces 86 being in contact with the soil and a third upper face 88 having connection points 90 at its opposite ends for connection with the mulching sheet 22. By this orientation, a depression 92 excavated by the machine which makes the dikes, is shaped complementary to the heat transfer tube. In this embodiment, a triangularly shaped tube, has two-thirds of the surface area of the tube in contact with the soil with one-third of the surface area exposed for absorption of heat from the sunlight with the upper face 88 lying substantially flat and continuous with the uppermost surface of the soil. Optionally, a drip irrigation line could be located below the intersection 94 of the two sides 86 for maximizing irrigation and intimate contact of the sides 86 of the heat transfer tube with the soil.

It is imperative that the heat transfer tube be in intimate contact with the surrounding soil located beneath the tube to effectively and efficiently transfer radiant heat from the water contained within the heat transfer tube to the surrounding soil. The amount of heat stored by the water within the heat transfer tube is dependent upon the amount of exposure of the transparent heat transfer tube to the heat generated by the sun.

Figure 12:
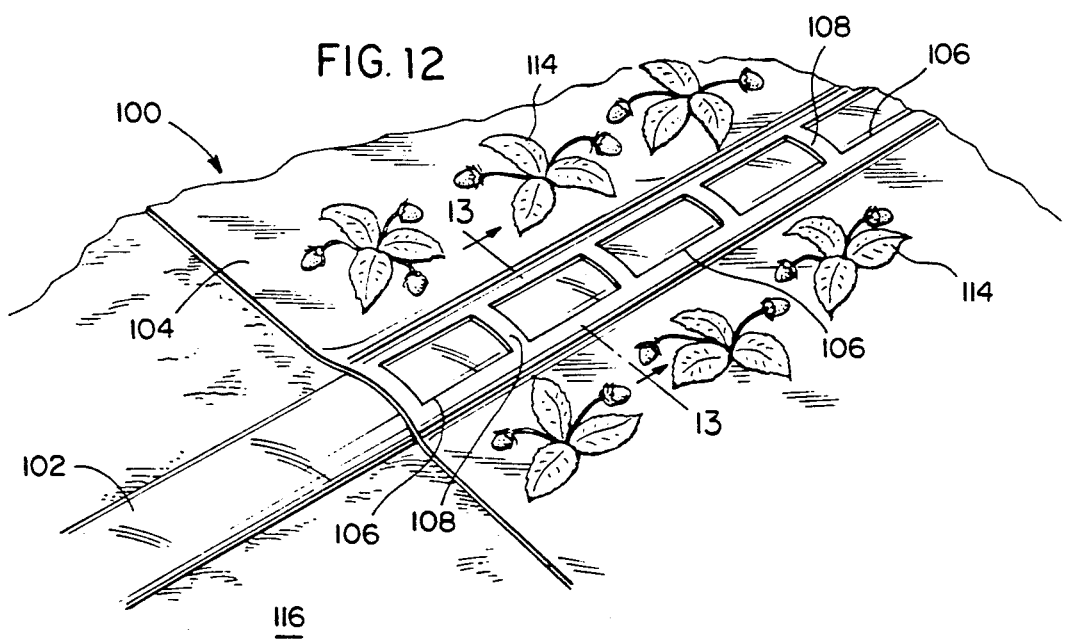
FIG. 12 is a perspective view of a heat transfer tube lying between two adjacent rows of seedlings at the peak of a dike with a mulch sheet overlying the heat transfer tube and including a plurality of spaced openings to allow sunlight to pass to the heat transfer tube.
Figure 13:
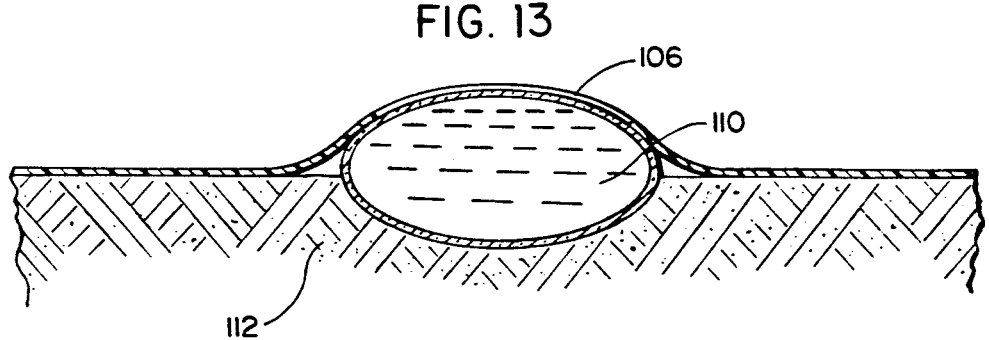
FIG. 13 is a sectional view taken along line 13—13 of FIG. 12.

In FIGS. 12 and 13, a heat transfer system 100 is shown which is installed by the following method. Since the heat transfer tubes are secured on opposite sides by a mulching sheet and manufactured into a rolled form, the rolled form includes an undulating surface due to the increased thickness at the points where the heat transfer tube is present compared to the single layer of the portions of the mulch sheet between adjacent heat transfer tubes. Accordingly, it is considered to be a method of the present invention to first lay a plurality of separate heat transfer tubes into a depression formed in a peak of dikes formed by a machine such that a portion of the heat transfer tube lays in intimate contact with the soil. Subsequently, a mulch sheet 104 is laid over the heat transfer tube 102 and the dikes.

The mulch sheet 104 includes a plurality of spaced openings or windows 106 which are separated by strips 108 to maintain the structural integrity of the mulch sheet 104 The mulch strip is laid over the heat transfer tube 102 so that the windows lie over the heat transfer tube and allow sunlight to pass through the openings onto the exposed transparent surface of the heat transfer tube 102. The water 110, located within the tube, is thereby heated during the daylight hours. Heat is then transferred from the water 110 to the surrounding soil 112 in contact with the bottom surface of the heat transfer tube during the night.

As explained with reference to FIGS. 1 through 11, the heat transfer tube is located between two rows of adjacent seedlings 114 at the peak 116 of a longitudinally extending dike as is shown in FIGS. 2 and 4. Alternately, two adjacent heat transfer tubes may be laid at a peak of a dike to separate three rows of seedlings with a central row of seedlings and two rows of seedlings outside of the two heat transfer tubes as shown in FIG. 4.

Having described the invention, many modifications thereto will become apparent to those skilled in the art to which it pertains without deviation from the spirit of the invention as defined by the scope of the appended claims.

I claim:

1. A heat transfer system for plants or crops, said heat transfer system comprising:
   a plurality of spaced dikes in a field, said dikes having side surfaces and a peak,
   a plurality of heat transfer tubes filled with water and extending parallel to each other and each of said heat transfer tubes being located between said side surfaces on said peak of the dikes and extending longitudinally along the dikes for absorbing and storing heat during daylight and for transferring heat to surrounding soil at night, and
   a mulching sheet extending between adjacent heat transfer tubes and said mulching sheet being connected on opposite sides to said heat transfer tubes.

2. A heat transfer system according to claim 1, wherein each heat transfer tube extends between at least two rows of seedlings on each dike for warming roots of the seedlings and the surrounding soil at night.

3. A heat transfer system according to claim 1, wherein said heat transfer tubes are transparent and at least a portion of said heat transfer tubes projects above the connection of the mulching sheet to each heat transfer tube.

4. A heat transfer system according to claim 3, wherein each heat transfer tube is triangularly shaped.

5. A heat transfer system according to claim 3, wherein a reflective layer lines a lowermost internal surface of said heat transfer tube.

6. A heat transfer system according to claim 2, wherein a spacing between adjacent heat transfer tubes is equal to a spacing between a center of adjacent dikes.

7. A heat transfer system according to claim 1, where a drip irrigation line is located below said heat transfer tube.

8. A heat transfer system according to claim 1, wherein a drip irrigation line is located above said heat transfer tube.

9. A heat transfer system according to claim 1, wherein a drip irrigation line is located within said heat transfer tube.

10. A heat transfer system according to claim 1, further comprising two heat transfer tubes on the peak of the dikes between three rows of seedlings on the peak of the dikes.

11. A heat transfer system for plants or crops, said heat transfer system comprising:
    a plurality of spaced dikes in a field,
    a plurality of separate heat transfer tubes located at a peak of adjacent dikes for absorbing and storing heat during daylight and for transferring heat to surrounding soil at night, and
    a mulching sheet located on a peak of said dikes and on said heat transfer tubes, said mulching sheet having a row of spaced longitudinally extending openings located on top of said heat transfer tubes to allow sunlight to pass through said openings onto said tubes.

12. A heat transfer system according to claim 11, wherein said heat transfer tubes are located between two rows of seedlings located on the peak of the dikes.

13. A method of heating soil for plants and crops, said method comprising:
    forming a plurality of longitudinally extending spaced apart dikes of earth having a wider base than peak, said dikes having a depression formed in the peak,
    locating a heat transfer tube in the depression formed in the peak so that a portion of the tube is in contact with the earth and a portion of the tube is exposed to the sun,
    locating a mulching sheet between adjacent tubes, and planting seedlings through the mulching sheet on the peaks of the dikes and adjacent opposite sides of the tubes.

14. A method of heating soil as claimed in claim 13, wherein the mulching sheet includes a plurality of rows of spaced longitudinally extending openings located on top of the tubes to allow sunlight to pass through the openings onto the tubes.

15. A method of heating soil as claimed in claim 13, wherein the mulching sheet is secured to opposite sides of the tubes.

16. A method of heating soil as claimed in claim 15, wherein the mulching sheet is secured adjacent to an uppermost surface of the tube.

17. A method of heating soil as claimed in claim 15, wherein the mulching sheet is secured adjacent to a lowermost surface of the tube.

18. A method of heating soil as claimed in claim 15, wherein the mulching sheet is secured adjacent to a midpoint of the opposite sides of the tube.

* * * * *